April 8, 1969   K. A. LUCAS ET AL   3,437,923
METHOD OF DETERMINING AVERAGE ORIENTATION OF WIRES IN MATERIAL
Filed Jan. 6, 1965
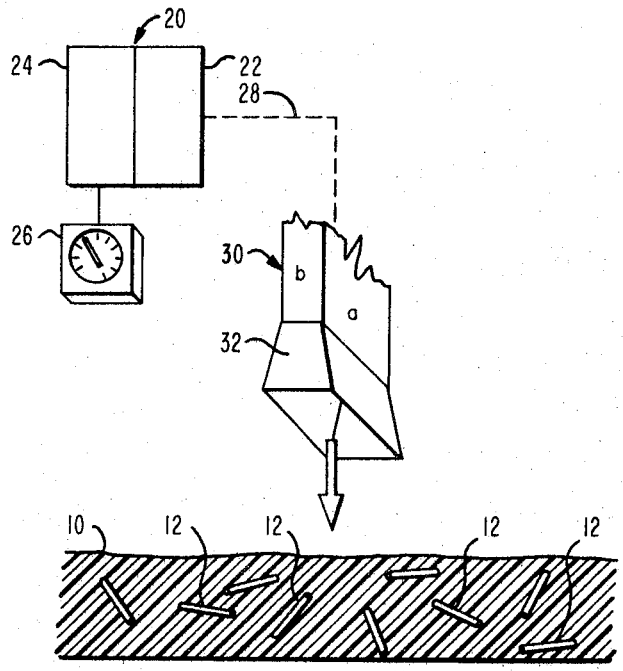
INVENTORS
KENNETH A. LUCAS
ROBERT B. OLIVER
BY
Edward O. Ansell
ATTORNEY

# United States Patent Office 3,437,923
Patented Apr. 8, 1969

3,437,923
METHOD OF DETERMINING AVERAGE ORIENTATION OF WIRES IN MATERIAL
Kenneth A. Lucas, Sacramento, and Robert B. Oliver, Citrus Heights, Calif., assignors to Aerojet-General Corporation, El Monte, Calif., a corporation of Ohio
Filed Jan. 6, 1965, Ser. No. 423,803
Int. Cl. G01r 27/02
U.S. Cl. 324—58.5                                                               4 Claims

ABSTRACT OF THE DISCLOSURE

This disclosure relates to methods for determining the average orientation of a plurality of metallic wires embedded in a material.

The method according to the present disclosure comprises directing polarized microwave radiation toward a material having a plurality of metallic wires embedded therein. The radiation is directed along each of a plurality of mutually perpendicular axes of the material. Microwave reflected from the material is measured and the average orientation of the wires may be determined by ascertaining the two axes yielding the greatest microwave reflection.

---

This invention relates to the manufacture of solid propellant rocket motors and has for its object to provide a novel method of and improved means for determining the orientation of large numbers of small metallic wires or staples which are embedded in the propellant to produce a high burning rate.

As is described in copending application, Ser. No. 338,527 filed Jan. 17, 1964, by Ralph J. Lawrence, entitled "Method of Increasing Propellant Burning Rate by the Use of High Conductive Wires," assigned to the same assignee as the present application, addition of large numbers of conductive metallic staples to solid propellant increases the burning rate, thereby increasing the specific impulse and thrust of the rocket motor. The orientation of these staples is of paramount importance however, as the resulting burning rate of the propellant is dependent upon their orientation. When aligned along the direction of burning of the thrust motor, the burning rate is the fastest because the staples conduct heat toward unburned propellant. If they are at some other angle to the direction of burning however, the burning rate is accordingly less than maximum as the metallic staples act in a manner analogous to a heat sink, thereby slowing down the burning.

There are a number of means of aligning staples in propellant, one of them being a screen-casting technique in which a screen is pulled through the viscous propellant to align the metal staples within the propellant in the desired orientation. This would be in a linear direction in the case of an end-burning grain, or radially in a radially burning grain etc. But such aligning methods are by no means infallible, and it is for this reason we have developed the novel method of and improved means for determining the orientation of such staples in solid propellant so that necessary corrective steps may be taken if measurements show that the condition of the propellant grain is less than optimum.

In its broadest aspect, the present invention comprises the application of microwaves to propellant samples in which are embedded a plurality of small metallic staples or wires to determine their orientation. We have found that the reflected strength of a microwave beam impinging upon a sample of propellant loaded with these wires can be directly related to the average orientation of the wires to the plane of polarization of the beam. By appropriate analysis of the reflected waves, the staple orientation is found. Corrective measures in propellant production can then be taken as required.

Referring now to the single figure, there is shown the propellant batch 10 in which are placed a plurality of staples 12 whose orientation is to be measured. In one application the staples comprise aluminum wires about one mil by one mil by 80 mils in size. The measuring apparatus is shown in relation to a propellant batch, but the process can be made operative with propellant cubes or samples as well. The microwave apparatus 20 is conventional and well known to those skilled in the art. Radiation from a transmitter 22 is fed through appropriate transmission or coupling means 28 to a waveguide 30 having a long edge 30a and a short edge 30b. Connected to the waveguide 30 is an exponential horn 32, the radiations from which are directed to the propellant 10. Reflected energy from the staples is conducted back through the horn 32, waveguide 30, coupling or transmission means 28 to the receiver 24, the output of which is fed to a readout device 26. By analysis of readout device indications, knowledge of staple orientation is determined. The coupling or transmission means 28 are understood to include such necessary ancillary equipment as may be necessary, such as a "magic tee," precision attenuator and sliding short etc. A more complete description of microwave equipment may be found in "Electronic & Radio Engineering" by F. E. Terman, McGraw-Hill Book Co. Inc., published in 1955 in such chapters, for example, as Chapter 5, "Waveguides and Cavity Resonators" and Chapter 19, "Microwave Tubes." Other appropriate texts include the MIT Radiation Laboratory Series, and the following publications available from the Superintendent of Documents, Government Printing Office, Washington 25, D.C. 20402: "Generation and Transmission of Microwave Energy," Catalog No. D 101.11:11–673; "Microwaves and Waveguides," Catalog No. D 211.2:M 58/2; "Microwave Techniques," Catalog No. D 211.2:M 58; and "Radio-Frequency Power Measurements," Catalog No. C 13.4:536.

As indicated in "Optics of the Electromagnetic Spectrum" by C. L. Andrews, Prentice-Hall, Englewood, N.J., 1961, if a plane parallel wire screen is placed in front of a plane polarized microwave transmitter so that its plane is perpendicular to the path of the microwave beam and its wires parallel to the electric field (E-field), which runs parallel to the short edge of the rectangular waveguide, the wave will (under ideal conditions) be totally reflected. If this screen is rotated 90° such that its wires are now perpendicular to the E-field the wave will be totally transmitted, under ideal conditions. For any angle $\theta$ that the wires make with the E-field the transmitted intensity, $I_t$, is proportional to the square of the cosine of the angle $\theta$. Where $I_o$ is the incident intensity, $$I_t = I_o \cos^2\theta$$

The intensity of the reflected wave is $$I_r = I_o \sin^2\theta$$

and $$I_o = I_t + I_r$$

In operation, the microwave beam emerges plane polarized from the exponential horn 32 and is reflected by the small wires 12 in the propellant 10. The beam reflects to a degree dependent upon the orientation of the wires 12 to the plane of polarization. When the greatest reflection for two axes of a sample is found, the wire orientation is also found.

Numerous laboratory measurements on cubical propellant samples containing wires were made, establishing the advantages of the method disclosed. As an aid in relating cubical samples to the rectangular waveguide 30, numbers were drawn on each face of the cube(s). All numbers were written such that the heights of the numbers were parallel to an edge. When this edge was parallel to the long edge 30a of the waveguide 30, the sample was said to be in the 0° position of rotation. When the sample was turned 90°, this edge of the sample was now parallel to the edge 30b of the waveguide 30 and the sample was said to be in the 90° position of rotation. In addition, the direction of microwave beam propagation along an axis was indicated by using direction cosines as follows:

$$\vec{3\text{-}1} = 100 \text{ direction}$$

$$\vec{1\text{-}3} = \bar{1}00 \text{ direction}$$

$$\vec{4\text{-}2} = 010 \text{ direction}$$

$$\vec{2\text{-}4} = 0\bar{1}0 \text{ direction}$$

$$\vec{6\text{-}5} = 001 \text{ direction}$$

$$\vec{5\text{-}6} = 00\bar{1} \text{ direction}$$

where 3-1 indicates that the microwave beam traversed the sample from face 3 to face 1.

In operation, the microwave beam emerging from the waveguide goes through the sample from surface four to surface two, and the number "2" is parallel to the long edge of the waveguide. A description of the sample position in this figure is therefore 010, 0°.

In the following tables random wire is compared with non-random wire alignment in samples of the same size. The ratio of the maximum reflected signal to the minimum reflected signal should be 1/1 ideally for the random samples, and greater than 1/1 for the oriented samples. Most attention should be given to this column titled "Ratio." The actual strength of the reflected signal given in the reflected intensity column, is most likely dependent also on wire orientation, but not necessarily.

The wire orientation on the 2-inch cubes was almost perfect and could be easily seen on the surfaces of the cubes. Inspection was made of two 1-inch oriented cubes, two 2-inch oriented cubes and two 2-inch random cubes.

*Live samples*

TABLE 1.—1-INCH, ORIENTED, SAMPLE NO. 1

| Direction | Reflected, 0° | Intensity, 90° | Ratio, max./min. |
| --- | --- | --- | --- |
| 100 | 2.4 | 8.5 | 3.5/1 |
| $\bar{1}$00 | 2.65 | 1.2 | 2.2/1 |
| 010 | 2.4 | 3.55 | 1.5/1 |
| 0$\bar{1}$0 | 2.9 | 3.8 | 1.3/1 |
| 001 | .90 | 3.6 | 4.0/1 |
| 00$\bar{1}$ | .85 | 3.1 | 3.6/1 |

TABLE 2.—1-INCH, ORIENTED, SAMPLE NO. 2

| Direction | Reflected, 0° | Intensity, 90° | Ratio, max./min. |
| --- | --- | --- | --- |
| 100 | 2.75 | 1.3 | 2.1/1 |
| $\bar{1}$00 | 2.5 | 1.05 | 2.4/1 |
| 010 | 3.1 | 2.3 | 1.4/1 |
| 0$\bar{1}$0 | 3.00 | 1.7 | 1.8/1 |
| 001 | 1.0 | 2.7 | 2.7/1 |
| 00$\bar{1}$ | 1.15 | 2.6 | 2.3/1 |

TABLE 3.—2-INCH, ORIENTED, SAMPLE NO. 1

| Direction | Reflected, 0° | Intensity, 90° | Ratio, max./min. |
| --- | --- | --- | --- |
| 100 | 1.9 | 2.75 | 1.4/1 |
| $\bar{1}$00 | 1.4 | 2.85 | 2.0/1 |
| 010 | 2.05 | 0.18 | 11.4/1 |
| 0$\bar{1}$0 | 1.6 | 0.4 | 4.0/1 |
| 001 | 2.2 | 0.23 | 9.6/1 |
| 00$\bar{1}$ | 1.7 | 0.38 | 4.5/1 |

TABLE 4.—2-INCH, ORIENTED, SAMPLE NO. 2

| Direction | Reflected, 0° | Intensity, 90° | Ratio, max./min. |
| --- | --- | --- | --- |
| 100 | 2.35 | 1.5 | 1.6/1 |
| $\bar{1}$00 | 2.7 | 1.7 | 1.6/1 |
| 010 | 2.4 | 0.33 | 7.3/1 |
| 0$\bar{1}$0 | 1.8 | 0.30 | 6.0/1 |
| 001 | 1.8 | 0.27 | 6.7/1 |
| 00$\bar{1}$ | 1.55 | 0.23 | 6.7/1 |

TABLE 5.—2-INCH, RANDOM, SAMPLE NO. 1

| Direction | Reflected, 0° | Intensity, 90° | Ratio, max./min. |
| --- | --- | --- | --- |
| 100 | 2.3 | 1.1 | 2.1/1 |
| $\bar{1}$00 | 2.0 | 0.8 | 2.5/1 |
| 010 | 2.1 | 1.4 | 1.5/1 |
| 0$\bar{1}$0 | 2.2 | 1.5 | 1.5/1 |
| 001 | 0.85 | 1.8 | 2.1/1 |
| 00$\bar{1}$ | 1.0 | 1.0 | 1.0/1 |

TABLE 6.—2-INCH, RANDOM, SAMPLE NO. 2

| Direction | Reflected, 0° | Intensity, 90° | Ratio, max./min. |
| --- | --- | --- | --- |
| 100 | 0.9 | 2.5 | 2.8/1 |
| $\bar{1}$00 | 1.3 | 2.3 | 1.8/1 |
| 010 | 0.8 | 1.1 | 1.4/1 |
| 0$\bar{1}$0 | 0.9 | 1.5 | 1.7/1 |
| 001 | 2.4 | 1.15 | 2.1/1 |
| 00$\bar{1}$ | 1.65 | 1.1 | 1.5/1 |

Sample #2 could not be called truly random as local orientation could be seen on the surface of the cubes. In the reading taken on the 100 direction for example, the relatively high reading of 2.1 and 2.5 can be ascribed to local areas of alignment visible on the surface of the sample.

In Tables 3 through 6 the effect is best shown. By rotating the sample 90°, the ratio of the reflected signal strengths of the 0° and 90° positions are much higher than one to one (1/1) in Tables 3 and 4.

The average of the "Ratio" column of Tables 3 and 4 is 5.17/1 while that of Tables 5 and 6 is 1.78/1. This is a 3/1 signal difference and clearly shows the orientation of the wires.

What has been disclosed therefore is the use of plane polarized microwaves in developing a control technique for one phase of the manufacture of high burning rate propellant. While the problem here to be solved was to find the orientation of a plurality of small metallic wires or staples which were embedded in solid propellant to produce a high burning ratio, the same technique could be used as well to determine the average orientation of metallic particles in other masses. The present invention is well adapted to carry out the object mentioned as well as others inherent therein.

What is claimed is:

1. The method of determining the average orientation of a plurality of metallic wires embedded in a material which comprises directing polarized microwave radiation toward said material along each of three mutually perpendicular axes of the material, measuring the microwave radiation reflected from said material for each directed microwave radiation, and determining the average orientation of the wires by ascertaining the two axes yielding the greatest microwave reflection.

2. The method according to claim 1 wherein the microwave radiation is successively directed along each of the axes.

3. The method according to claim 1 wherein the microwave radiation is directed toward said material from each of six axial positions, two positions being located on each axis at opposite sides of the material, and the average orientation of the wires is determined by ascertaining the two positions on different axes yielding the greatest microwave reflection.

4. The method according to claim 3 wherein the microwave radiation is successively directed from each of the six axial positions.

References Cited

UNITED STATES PATENTS

| 2,463,297 | 3/1949 | Muskat et al. | 324—58.5 |
| 2,999,982 | 9/1961 | Broussaud | 324—58.5 |
| 3,278,841 | 10/1966 | Hanson et al. | 324—58.5 |

OTHER REFERENCES

Optics of the Electromagnetic Spectrum, Andrews, Prentice-Hall (1961), pp. 394–396.

RUDOLPH V. ROLINEC, *Primary Examiner.*

P. F. WILLE, *Assistant Examiner.*